(12) United States Patent
van Zwam et al.

(10) Patent No.: US 9,325,177 B2
(45) Date of Patent: Apr. 26, 2016

(54) APPARATUS AND METHOD FOR BALANCING CELLS IN A PLURALITY OF BATTERIES

(71) Applicant: Actuant Corporation, Menomonee Falls, WI (US)

(72) Inventors: Arnoldus Albert Gerardus van Zwam, Utrecht (NL); Jan Wanner, Bonaire (NA); John de Rijk, De Kwakel (NL); Marinus Petronella Nicolaas van Wesenbeeck, Rotterdam (NL)

(73) Assignee: Power Products, LLC, Menomonee Falls, WI (US)

( * ) Notice: Subject to any disclaimer, the term of this patent is extended or adjusted under 35 U.S.C. 154(b) by 88 days.

(21) Appl. No.: 14/092,275

(22) Filed: Nov. 27, 2013

(65) Prior Publication Data

US 2014/0145670 A1    May 29, 2014

Related U.S. Application Data

(60) Provisional application No. 61/730,562, filed on Nov. 28, 2012.

(51) Int. Cl.
| | |
|---|---|
| *H02J 7/00* | (2006.01) |
| *B60L 11/18* | (2006.01) |
| *H02M 1/00* | (2007.01) |
| *H02M 3/335* | (2006.01) |

(52) U.S. Cl.
CPC ........... *H02J 7/0014* (2013.01); *B60L 11/1809* (2013.01); *H02J 7/0016* (2013.01); *H02J 7/0018* (2013.01); *H02M 3/33584* (2013.01); *H02M 2001/0045* (2013.01); *Y02T 10/7011* (2013.01); *Y02T 10/7055* (2013.01)

(58) Field of Classification Search
CPC ... Y02T 10/7005; Y02T 90/14; Y02T 10/705; Y02T 10/7088; Y02E 60/12
USPC .......................................................... 320/104
See application file for complete search history.

(56) References Cited

U.S. PATENT DOCUMENTS

| | | | |
|---|---|---|---|
| 6,377,023 B1 | 4/2002 | Capel | |
| 8,594,873 B2 * | 11/2013 | Kimura et al. | 701/22 |
| 2004/0135544 A1 * | 7/2004 | King et al. | 320/116 |
| 2009/0208824 A1 * | 8/2009 | Greening et al. | 429/91 |
| 2009/0325056 A1 * | 12/2009 | Greening et al. | 429/121 |
| 2010/0244781 A1 * | 9/2010 | Kramer et al. | 320/162 |
| 2011/0285352 A1 * | 11/2011 | Lim et al. | 320/118 |
| 2012/0194133 A1 | 8/2012 | Posamentier et al. | |
| 2012/0299531 A1 * | 11/2012 | Prosser et al. | 320/104 |

OTHER PUBLICATIONS

European Partial Search Report for Application No. 13194401.9 dated Jun. 12, 2014 (6 pages).

* cited by examiner

*Primary Examiner* — Arun Williams
(74) *Attorney, Agent, or Firm* — Michael Best & Friedrich LLP

(57) ABSTRACT

An apparatus for balancing a plurality of cells in a battery includes common bus having a connector for connecting to a common bus of another battery. Each of plurality of balancing circuits has a bidirectional voltage converter connected to a given cell of the plurality of cells and a linear current regulator arrangement controls the magnitude of current flow between the bidirectional voltage converter. A controller is connected to the common bus and the plurality of cells and selectively operatives the plurality of balancing circuits to transfer energy between the plurality of cells and the common bus to balance the states of charge of the cells. The balancing circuits are operated in response to actual states of charge of the cells, an average state of charge, a desired voltage level for the common bus, and an actual voltage level on the common bus.

21 Claims, 2 Drawing Sheets

APPARATUS AND METHOD FOR BALANCING CELLS IN A PLURALITY OF BATTERIES

CROSS-REFERENCE TO RELATED APPLICATIONS

This application claims the benefit of the filing date of U.S. Provisional Patent Application No. 61/730,562 filed Nov. 28, 2012, the disclosure of which is incorporated herein by reference for all purposes.

STATEMENT REGARDING FEDERALLY SPONSORED RESEARCH OR DEVELOPMENT

Not applicable.

BACKGROUND OF THE INVENTION

1. Field of the Invention

The present invention relates to an electrical installation having a plurality of interconnected batteries each having multiple cells, and more particularly to balancing the state of charge of all the cells in those batteries.

2. Description of the Related Art

Lithium-ion batteries are commonly used to power electronic devices and electrically operated vehicles. This family of rechargeable batteries provides relatively high, energy density and relatively slow loss of charge when not in use. As with other types of batteries, lithium-ion devices comprise a plurality of cells connected in series to produce the desired output voltage for the battery. Over its useful life, the battery may be charged and discharged for hundreds or even thousands of cycles. As this occurs, the individual cells age differently. As a consequence, some cells of the battery may become mismatched in terms of voltage level and state of charge with respect to other cells. If this mismatch is not corrected, one or more of the cells can become overcharged or undercharged, either of which can lead to failure of the battery.

To counteract the effects of cell mismatch, various balancing techniques have been devised for forcing all the cells to have identical voltage. This is accomplished by a balancing circuit that draws energy from cells having a higher voltage and applies that energy to a shared bus. Other cells having a lower voltage are charged further using energy from the shared bus. Each cell is associated with a bidirectional converter that controls the flow of energy between the cell and the shared bus. A balancing technique that is based on individual cell voltages does not ensure all the cells will have same state of charge, as the voltage does not directly indicate the state of charge where the cells differ in capacity and internal resistance.

Although such prior techniques approximately balanced the cells within a battery, those techniques did not account for cell mismatch between multiple batteries connected in series. Several batteries are often connected in series in equipment requiring a relatively high voltage. In this type of installation, however, the cells in one battery may be balanced to a level that is mismatched to the level at which the cells in an adjacent battery are balanced. In that installation, the capacity of the "worst" battery determines the capacity of the series. Therefore, it is desirable to be able to balance all the cells in the series of interconnected batteries to the same level so that the average capacity of the individual cells determines the total capacity of the system.

Nevertheless, the batteries in many applications must be physically separated from one another by a significant distance. For example, in an auxiliary power supply for a yacht, the relatively large and heavy batteries are distributed through the vessel to balance the weight for proper buoyancy. Because it is also desirable to maximize the living space within the yacht, the individual batteries must be placed at different locations where storage space is available. This physical separation of the different batteries presents an additional challenge in providing a mechanism to balance all the batteries to a common level.

SUMMARY OF THE INVENTION

An apparatus for balancing a plurality of cells in a battery comprises a common bus that has a connector for coupling the common bus to the common bus of another battery. Each cell is associated with a separate balancing circuit that includes a bidirectional voltage converter connected to that cell and a linear current regulator arrangement which controls the amount of current that flows between the voltage converter and the common bus. The apparatus also has a controller that is operatively connected to the common bus and the plurality of cells to sense electrical parameters and in response thereto operate the plurality of balancing circuits.

The balancing circuits are operated to convey energy from cells having a relatively high state of charge to the common bus, and convey energy from the common bus to cells having a relatively low state of charge. That transfer of energy tends to place all the cells of the battery at approximately the same state of charge.

In one implementation of the present balancing concept, the controller operates the plurality of balancing circuits in response to determining (a) a state of charge for each of the plurality of cells, (b) an average of the states of charge of all the battery cells, (c) a desired voltage level derived from the plurality of states of charge, and (d) an actual voltage level on the common bus.

In a system having a plurality of batteries connected in series, the apparatus for balancing a plurality of cells in each battery also balances the batteries to each other due to the interconnection of the common buses in all the batteries.

DETAILED DESCRIPTION OF THE INVENTION

Figure 1:
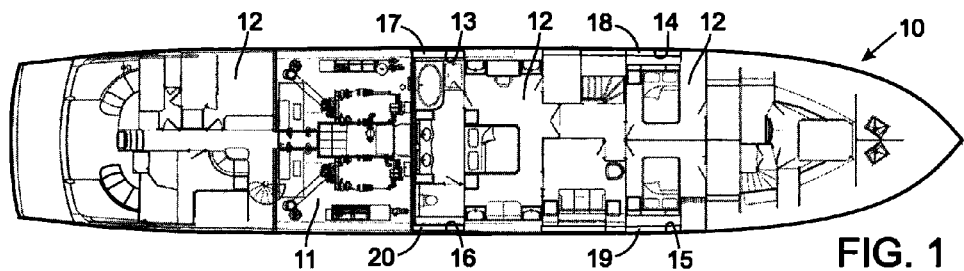
FIG. 1 illustrates the floor plan of one deck in a yacht.

With initial reference to FIG. 1, a yacht 10 has an engine room 11 and a plurality of living compartments 12. When the yacht is anchored and the engines are not running, electrical power for lighting and appliances is supplied by a plurality of batteries 17, 18, 19, and 20 located in individual compartments 13, 14, 15, and 16 distributed remotely throughout the hull of the yacht 10. The location of the batteries not only distributes their weight equally throughout the vehicle, but also locates the batteries in places that cannot be used for the living compartments.

Figure 2:
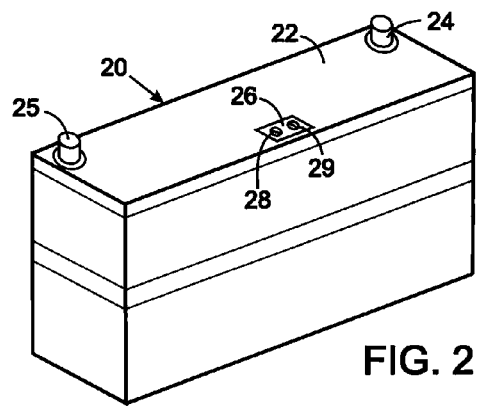
FIG. 2 is a perspective view of a battery according to the present invention.
Figure 3:
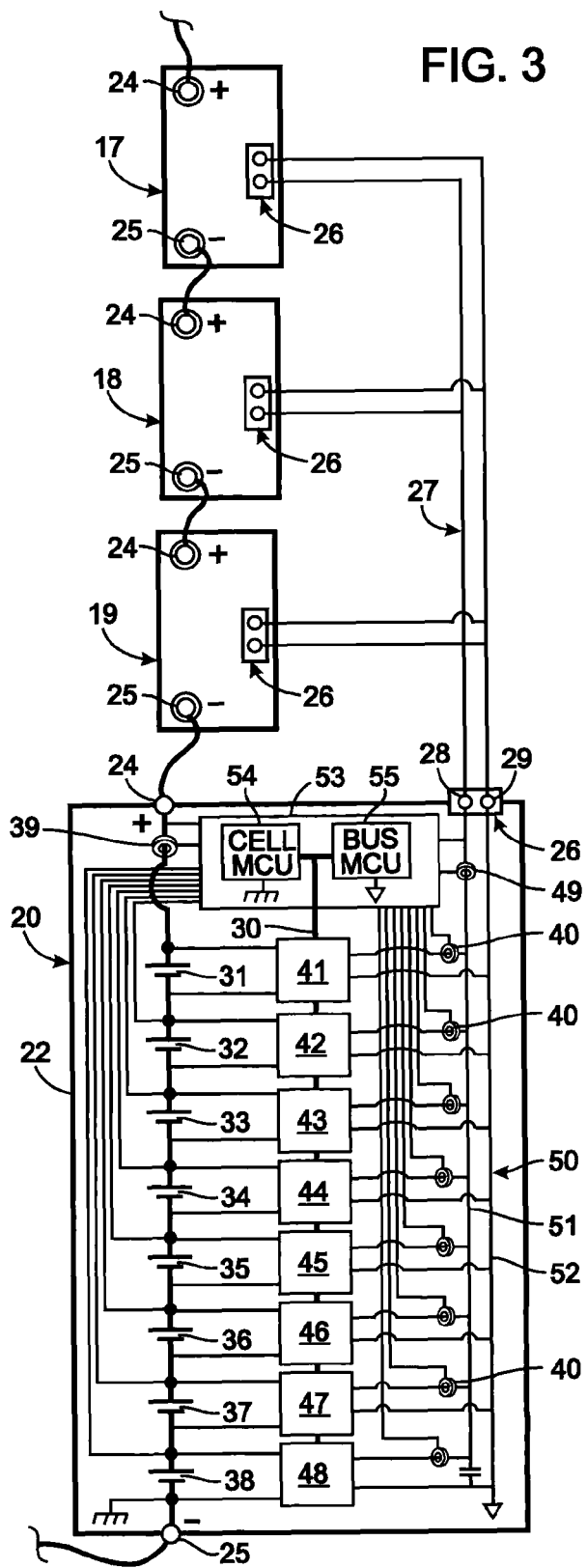
FIG. 3 is a schematic circuit diagram illustrating four of the batteries connected in series.

Each of the batteries 17-20 has an identical construction, with battery 20 being depicted in FIG. 2. The battery 20 has an outer case 22 with a positive terminal 24 and a negative terminal 25. The outer case 22 also has an external connector 26 with a pair of terminals 28 and 29 for a common bus that will be described hereinafter. Referring to FIG. 3, the four batteries 17-20 are connected in series. The details of battery 20 will be described with the understanding that the description applies to the other batteries as well.

Battery 20 has eight cells 31, 32, 33, 34, 35, 36, 37 and 38, however, the present concept may be used with batteries having a greater or lesser number of cells. The cells 31-38 are connected in series between the positive and negative terminals 24 and 25. The positive terminal 24 of battery 20 is connected to the negative terminal 25 of battery 19. Each cell 31-38 is connected to a separate balancing circuit 41-48, respectively. Each balancing circuit 41-48 also is connected to a common bus 50 having first and second conductors 51 and 52 that are respectively connected to terminals 28 and 29 of the external common bus connector 26. The terminals 28 and 29 of the external common bus connector 26 on battery 20 are connected by a cable 27 to like terminals 28 and 29 on the other batteries 17-19.

The eight balancing circuits 41-48 are operated by a programmable controller 53 that has a cell micro-control unit (MCU) 54, that controls the components of the balancing circuits that are connected to the cells, and has a bus micro-control unit (MCU) 55, that controls the components of the balancing circuits that are connected to the common bus 50. The cell and bus MCU's 54 and 55 are microcomputer based devices that are interconnected to share data. That dual micro-control unit configuration provides isolation between the cell and bus sides of the balancing circuits 41-48. The cell MCU 54 has inputs connected to sense the voltages at each of the eight cells 31-38 and to receive a signal from current sensor 39 that measures current flowing through the battery's positive terminal 24. The bus MCU 55 has an input for sensing the voltage on the common bus 50. Other inputs of the bus MCU 55 are connected to current sensors 40 that measure current flowing between each balancing circuit 41-48, and to another current sensor 49 that measures current flow through the external common bus connector 26. Both the cell and bus MCU's 54 and 55 have a plurality of outputs coupled by a control bus 30 to drive transistors within the balancing circuits 41-48, as will be described. Alternatively, the controller 53 may be implemented by a single micro-control unit or by more than two micro-control units.

Figure 4:
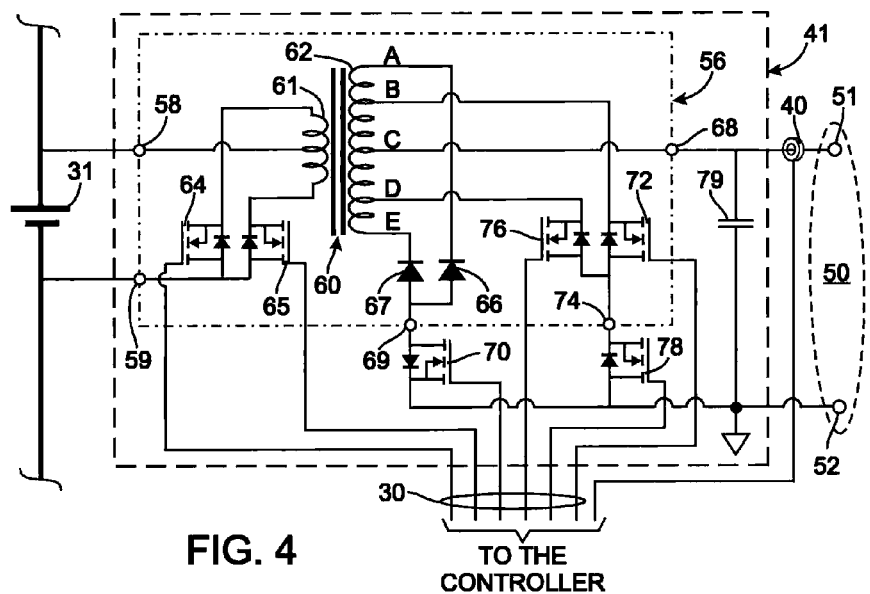
FIG. 4 is a schematic diagram of the balancing circuit for one of the batteries.

FIG. 4 shows the circuitry for balancing circuit 41 with the understanding that the other balancing circuits 42-48 contain identical circuitry. The balancing circuit 41 has a bidirectional DC to DC voltage converter 56, and first and second linear current regulators 70 and 78 that together form a current regulator arrangement. The bidirectional DC to DC voltage converter 56 in one operating mode steps up the voltage appearing across an associated battery cell to a higher level for the common bus and in another operating mode steps down the voltage on the common bus to a lower level for the associated battery cell. The bidirectional voltage converter 56, is shown as a single device that performs that bidirectional conversion, alternatively a pair of oppositely arranged unidirectional converter devices can be used to provide the bidirectional conversion. Thus the term "bidirectional voltage converter" as used herein covers both those implementations.

The voltage converter 56 is connected to opposite sides of the associated battery cell 31 by first and second cell terminals 58 and 59. The first cell terminal 58 is directly connected to a center cap of a first winding 61 on a transformer 60 within the voltage converter. The second cell terminal 59 is coupled by a first cell transistor 64 to a first tap at one end of the first winding 61 and by a second cell transistor 65 to a second tap at the opposite end of the first winding. The first and second cell transistors 64 and 65 are controlled by bias signals from the controller 53.

The transformer 60 has a second winding 62 with a center tap C that is connected by a first bus terminal 68 directly to the first conductor 51 of the common bus 50. First and second taps A and E at opposite ends of the second winding 62 are respectively coupled by first and second diodes 66 and 67 to a second bus terminal 69. For example, the ratio of the number of turns in each half of the first winding to the number of turns between the center tap C and each of the end taps A and E in the second winding is 1:N+1. The second winding 62 has a third tap B, between the center tap C and the first tap A, which is coupled by a first bus transistor 72 to a third bus terminal 74. A fourth tap D, on the second winding 62 between the center tap C and the second tap E, is connected by a second bus transistor 76 to the third bus terminal 74. For example, the ratio of the number of turns in each half of the first winding to the number of turns between the center tap C and each of the intermediate third and fourth taps B and D of the second winding is 1:N. The third bus terminal 74 is coupled by a second linear current regulator, comprising a second MOSFET, to the second conductor 52 of the common bus 50. As noted, the DC to DC voltage converter 56 is bidirectional, able to transfer energy is in either direction between a battery cell and the common bus. The turns ratios of the transformer 60 enable the voltage converter 56 to increase the voltage across the associated cell 31 to a higher level that is applied to the common bus 50 in one mode of operation of the balancing circuit 41. In another mode of operation, the voltage on the common bus 50 is decreased by the voltage converter 56 to a lower level that is applied to charge the associated cell 31.

The second bus terminal 69 is connected to the second conductor 52 of the common bus 50 by a first linear current regulator 70, comprising a first MOSFET, for example. The third bus terminal 74 is coupled by the second linear current regulator 78 to the second conductor 52 of the common bus 50, comprising a second MOSFET, for example. A filter capacitor 79 is connected across the two conductors 51 and 52 of the common bus 50.

Periodically, the cell MCU 54 in every battery 17-20 calculates the individual state of charge (SOC) of each cell 31-38 in that battery. Calculation of the state of charge may be accomplished using any of several well-known methods for performing that function, such a Kalman filtering technique of the type described for example in Jonghoon Kim, et al., "Determination of State of Charge Based on Extended Kalman Filter Using Per Unit System and Time Constant Principle," 31st International Telecommunications Energy Conference, Oct. 18-22, 2009. The controller 53 then compares the states of charge of the individual cells and determines the greatest and smallest states of charge. When the difference between the greatest and smallest states of charge exceeds a predefined amount, the controller commences a cell balancing operation. At that time, the average of all the individual states of charge for battery cells 31-38 is computed. The average state of charge ($SOC_{AVG}$) is then multiplied by a first constant K1 to derive a desired voltage level ($V_{COMMON}^{REF}$) for the common bus 50. That relationship is specified by the equation:

$$V_{COMMON}^{REF} = K1 * SOC_{AVG} \tag{1}$$

Next for each cell, a desired level of current $I_{CR\_i}^{REF}$ which will be enabled to flow between that cell and the common bus 50 is calculated according to the equation:

$$I_{CR\_i}^{REF}=K2(SOC_{AVG}-SOC_{in})+ \\ (1/n*K3(V_{COMMON}^{REF}-V_{COMMON})) \quad (2)$$

where $SOC_i$ is state of charge for cell i, n is the total number of cells in the battery, and $V_{COMMON}$ is the actual measured voltage on the common bus 50. It should be understood that the desired current level for a given cell has a sign that indicates whether the current is flowing from the cell to the common bus or from the common bus to the cell. The numerical value of the desired current level indicates the magnitude of that current flow.

Once the desired current levels for all the cells 31-38 in the particular battery have been determined, the controller 53 begins operating the balancing circuits 41-48 in a manner to provide those current flows between the respective battery cells and the common bus 50.

With continuing reference to FIG. 4, to transfer energy from a battery cell (e.g., cell 31), the controller 53 operates the voltage converter 56 associated with that cell to supply current through the transformer to the common bus 50. To do so, the first and second cell transistors 64 and 65 are alternately turned on to feed current pulses from the cell 31 through different halves of the first winding 61. The first and second cell transistors 64 and 65 operate alternately in a push-pull configuration, each producing a 50% duty cycle, pulse width modulated signal.

The resulting current pulses in the first winding induce current in the second winding 62, which current is rectified by the diodes 66 and 67 and flows to the first conductor 51 of the common bus 50. That latter current flow is measured by the cell current sensor 40. The controller 53 responds to the actual current flowing into the common bus 50 by varying the drive bias on the gate of the first linear current regulator 70 so that the actual level of current from the balancing circuit into the common bus 50 is regulated to equal the desired current level $I_{CR\_i}^{REF}$ for the associated cell. Thus the first linear current regulator 70 controls the magnitude of current and thus the amount of energy that flows from the battery cell that has an above-average state of charge into the common bus 50. In this mode of operation, the two bus transistors 72 and 76 and the second linear current regulator 78 are turned off so as to be non-conductive.

Referring still to FIG. 4, the balancing circuit 41 can be operated in another mode in which energy is transferred from the common bus 50 to an individual cell that has a below-average state of charge. In this mode, the two cell transistors 64 and 65 of the voltage converter 56 are turned off so as to be non-conductive. The first linear current regulator 70 also is placed in a non-conductive state. Now, the controller 53 alternately turns the first and second bus transistors 72 and 76 on and off, so that each applies a 50% duty cycle, pulse width modulated signal to the intermediate third and fourth taps B and D of the second winding 62 of transformer 60. At the same time, the controller 53 is driving the second linear current regulator 78 to control the level of current flowing through the two bus transistors 72 and 76. That level of current is controlled using a feedback signal from sensor 40 so that the actual level of current equals the desired current level $I_{CR\_i}^{REF}$, previously calculated for this cell 31 of the battery. In this mode in which energy is conveyed from the common bus 50 to the battery cell 31, the amount of current that excites the transformer 60 is controlled to that desired level. The current flowing through the third and fourth taps B and D induces a voltage in the first winding 61 of the transformer 60. The transformer 60 drops the higher voltage level on the common bus down to a lower voltage level to apply across the battery cell 31. Current induced in the first winding 61 flows to the cell 31 through a circuit formed by the flyback diodes in the first and second cell transistors 64 and 65.

The present balancing technique not only balances the cells within a particular battery 20, but also balances those cells with respect to the cells in the other batteries 17-19. This is accomplished because each battery applies a voltage level to its common bus that is a function of the average state of charge of the cells within that particular battery, as defined by equations (1) and (2) above. Thus a battery with a relatively high average state of charge attempts to apply a higher voltage level to its common bus 50 than the voltage level another battery with a lower average state of charge attempts to apply to its common bus. Because the common buses 50 in all the batteries 17-20 are electrically connected together by the connectors 26 and cable 27, the voltages that are applied to the common buses balance out. This produces an actual voltage on each battery's common bus 50 that is slightly different than what each individual battery is attempting to achieve. Note that in equation (2) above, the desired current level $I_{CR\_i}^{REF}$ for each cell is derived as a function of the actual voltage $V_{COMMON}$ appearing on the common bus 50, which in effect is a combination of the individual voltages that each battery 17-20 attempts to apply to its common bus. Therefore, the balancing of each cell 31-38 is affected by the average state of charge of not only its battery, but of all the other batteries connected in series. This results in every cell in all the batteries being balanced to substantially the same state of charge level and current flows between the battery common bus until that is accomplished.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An apparatus for balancing a plurality of cells in a battery, said apparatus comprising:
    a first common bus,
    a connector for connecting the first common bus to another common bus of another battery;
    a plurality of balancing circuits, each comprising a bidirectional voltage converter connected to a given cell of the plurality of cells, and a linear current regulator arrangement for varying a magnitude of current flowing between the bidirectional voltage converter and the first common bus; and
    a controller operatively connected to the first common bus, the plurality of cells and the plurality of balancing circuits, the controller configured to determine the magnitude of current flowing between the bidirectional voltage converter and the first common bus based on a desired voltage level for the first common bus.

2. The apparatus as recited in claim 1 wherein the controller operates the plurality of balancing circuits to selectively transfer energy from at least one of the plurality of cells to the first common bus and to transfer energy from the first common bus to at least another one of the plurality of cells.

3. The apparatus as recited in claim 1 wherein the controller operates the plurality of balancing circuits in response to determining a state of charge for each of the plurality of cells, thereby producing a plurality of states of charge, a desired voltage level derived from the plurality of states of charge, and an actual voltage level on the first common bus.

4. The apparatus as recited in claim 1 wherein the bidirectional voltage converter comprises:
- a transformer having a first winding with one tap connected to one side of the given cell terminal, and having a second winding with a tap connected to a first conductor of the common bus;
- a first cell transistor for controlling current flow between another side of the given cell and another tap of the first winding;
- a first bus transistor for controlling current flow between another tap of the second winding and one bus terminal coupled to a second conductor of the first common bus;
- a first diode providing a current path between a further tap of the second winding and another bus terminal.

5. The apparatus recited in claim 4 wherein the linear current regulator arrangement couples the two bus terminals to the second conductor of the common bus.

6. The apparatus as recited in claim 1 wherein the bidirectional voltage converter comprises:
- a first and second cell terminals across which the given cell is connected;
- first, second, and third bus terminals, wherein the first bus terminal is connected to one conductor of the first common bus;
- a transformer having a first winding with a center tap connected to the first cell terminal, and a second winding with a center tap connected to the first bus terminal;
- a first cell transistor for controlling current flow between the second cell terminal and a first tap of the first winding;
- a second cell transistor for controlling current flow between the second cell terminal and a second tap of the first winding;
- a first diode providing a current path between the second bus terminal and a first tap of the second winding; and
- a second diode providing a current path between the second bus terminal and a second tap of the second winding;
- a first bus transistor for controlling current flow between a third tap of the second winding and the third bus terminal;
- a second bus transistor for controlling current flow between a fourth tap of the second winding and the third bus terminal.

7. The apparatus as recited in claim 6 wherein the linear current regulator arrangement comprises:
- a first linear current regulator operatively connected to control a level of current flowing between the second bus terminal and a second conductor of the first common bus; and
- a second linear current regulator operatively connected to control a level of current flowing between the third bus terminal and the second conductor of the first common bus.

8. The apparatus as recited in claim 7 wherein the controller:
- in a first mode of operation alternately switches the first and second cell transistors into conductive and non-conductive states, and operates the first linear current regulator to conduct current; and
- in a second mode of operation alternately switches the first and second bus transistors into conductive and non-conductive states, and operates the second linear current regulator to conduct current.

9. The apparatus as recited in claim 1 wherein the controller is further configured to determine an actual state of charge for each of the plurality of cells and an average state of charge for the plurality of cells.

10. The apparatus as recited in claim 9 wherein the desired voltage level ($V_{COMMON}^{REF}$) for the common bus is determined according to the expression:

$$V_{COMMON}^{REF}=K1*SOC_{AVG}$$

where K1 is a constant and $SOC_{AVG}$ is the average state of charge.

11. The apparatus as recited in claim 9 wherein the controller is further configured to derive a separate desired level of current associated with each of the plurality of cells and to operate each of the plurality of balancing circuits in response to the desired level of current associated with the given cell to which the respective balancing circuit is connected.

12. The apparatus as recited in claim 9 wherein the desired level of current ($I_{CR\_i}^{REF}$) associated with one of the plurality of cells is determined according to the expression:

$$I_{CR\_i}^{REF}=K2(SOC_{AVG}-SOC_i)+(1/n*K3(V_{COMMON}^{REF}-V_{COMMON}))$$

where K2 and K3 are constants, $SOC_i$ is the state of charge of cell i, n is a total number of cells in the battery, $V_{COMMON}^{REF}$ is the desired voltage level for the common bus, and $V_{COMMON}$ is an actual voltage level on the common bus.

13. A method for balancing a plurality of batteries, wherein each battery has a plurality of cells, a plurality of balancing circuits each associated with one of the plurality of cells and connected to a common bus, and wherein the common buses of all the plurality of batteries being connected together, said method comprising for each battery:
- determining a state of charge for each of the plurality of cells, thereby producing a plurality of states of charge;
- calculating an average state of charge for the plurality of states of charge;
- sensing an actual voltage level present on the common bus;
- using the average state of charge to derive a desired voltage level for the common bus;
- for each cell of the plurality of cells, deriving a desired current level based on the state of charge of that respective cell, the average state of charge, the desired voltage level, and the actual voltage level; and
- operating the plurality of balancing circuits to convey energy between at least some of the plurality of cells and the common bus, wherein each balancing circuit is operated in response to the desired current level for the associated cell.

14. The method as recited in claim 13 wherein each balancing circuit conveys energy from the associated cell to the common bus when the state of charge of the associated cell is greater than the average state of charge, and conveys energy from the common bus to the associated cell when the state of charge of the associated cell is less than the average state of charge.

15. The method as recited in claim 13 wherein current flow between each balancing circuit and the common bus is controlled in response to the desired current level for the associated cell.

16. The method as recited in claim 13 wherein the desired voltage level $V_{COMMON}^{REF}$ for the common bus is determined according to the equation:

$$V_{COMMON}^{REF}=K1*SOC_{AVG}$$

where K1 is a constant, and $SOC_{AVG}$ is the average state of charge.

17. The method as recited in claim 13 wherein the desired level of current ($I_{CR\_i}^{REF}$) for a given cell of the plurality of cells is determined according to the equation:

$$I_{CR\_i}^{REF}=K2(SOC_{AVG}-SOC_i+(1/n*K3(V_{COMMON}^{REF}-V_{COMMON}))$$

where K2 and K3 are constants, $SOC_{AVG}$ is the average state of charge, $SOC_i$ the actual state of charge of the given cell, n is a total number of cells in the battery, $V_{COMMON}^{REF}$ is the desired voltage level for the common bus, and $V_{COMMON}$ is an actual voltage level on the common bus.

18. A system for providing electrical power for operating a vehicle, said system comprising:
- a plurality of batteries located in different, remotely separated compartments on the vehicle and connected together and to electrical circuits on the vehicle, each battery includes a plurality of cells and a separate apparatus for balancing the plurality of cells;
- the separate apparatus for each battery comprising:
  - (a) a common bus with an externally accessible bus connector that is electrically connected to bus connectors on other ones of the plurality of batteries;
  - (b) a plurality of balancing circuits, each comprising a bidirectional voltage converter connected to a given cell of the plurality of cells, a linear current regulator arrangement that controls an amount of current that flows between the bidirectional voltage converter and the common bus; and
  - (c) a controller operatively connected to the common bus and the plurality of cells, and operating the plurality of balancing circuits to selectively transfer energy from at least one of the plurality of cells to the common bus and transfer energy from the common bus to at least another one of the plurality of cells, the controller configured to determine the magnitude of current flowing between the bidirectional voltage converter and the first common bus based on a desired voltage level for the first common bus.

19. The system as recited in claim 18 wherein the controller operates the plurality of balancing circuits in response to determining a state of charge for each of the plurality of cells thereby producing a plurality of states of charge, a desired voltage level derived from the plurality of states of charge, and an actual voltage level on the common bus.

20. The system as recited in claim 19 wherein the controller is configured to operate each balancing circuit in response to a first difference between the state of charge for one of the cells that is associated with that respective balancing circuit and an average of the plurality of states of charge, and in response to a second difference between a desired voltage level derived from the plurality of states of charge and an actual voltage level on the common bus.

21. The system as recited in claim 18 wherein the bidirectional voltage converter comprises:
- a first and second cell terminals across which the given cell is connected;
- first, second, and third bus terminals, wherein the first bus terminal is connected to one conductor of the common bus;
- a transformer having a first winding with a center tap connected to the first cell terminal, and a second winding with a center tap connected to the first bus terminal;
- a first cell transistor for controlling current flow between the second cell terminal and a first tap of the first winding;
- a second cell transistor for controlling current flow between the second cell terminal and a second tap of the first winding;
- a first diode providing a current path between the second bus terminal and a first tap of the second winding; and
- a second diode providing a current path between the second bus terminal and a second tap of the second winding;
- a first bus transistor for controlling current flow between a third tap of the second winding and the third bus terminal;
- a second bus transistor for controlling current flow between a fourth tap of the second winding and the third bus terminal.

\* \* \* \* \*